United States Patent
Love

[15] 3,662,853
[45] May 16, 1972

[54] TRANSPORTERS
[72] Inventor: Norman Edward Love, Binstead, Ryde, Isle of Wight, England
[73] Assignee: British Hoovercraft Corporation Limited, Yeovil, Somerset, England
[22] Filed: Dec. 15, 1969
[21] Appl. No.: 885,136

[30] Foreign Application Priority Data
Dec. 19, 1968   Great Britain ................60,354/68

[52] U.S. Cl. .................180/121, 180/7, 180/116, 180/119
[51] Int. Cl. .................................................B60v 1/00
[58] Field of Search................180/121, 116, 117, 118, 120, 180/127, 1.2; 280/43.23

[56] References Cited

UNITED STATES PATENTS

| | | | |
|---|---|---|---|
| 3,243,193 | 3/1966 | Fulmer et al. | 280/43.23 X |
| 3,520,381 | 7/1970 | Pinder | 180/127 |
| 1,396,785 | 11/1921 | Schfield | 180/1.2 |
| 3,150,731 | 9/1964 | Franklin et al. | 180/120 |
| 3,182,739 | 5/1965 | Cockerell | 180/118 |
| 3,183,988 | 5/1965 | Jones | 180/117 |
| 3,244,248 | 4/1966 | Prickett | 180/127 |
| 3,233,693 | 2/1966 | Havercamp | 180/120 |
| 3,473,624 | 10/1969 | Mezhlumov et al. | 180/127 |

FOREIGN PATENTS OR APPLICATIONS

| | | | |
|---|---|---|---|
| 780,181 | 3/1968 | Canada | 180/121 |
| 1,012,812 | 12/1965 | Great Britain | 180/116 |

Primary Examiner—A. Harry Levy
Attorney—Larson, Taylor & Hinds

[57] ABSTRACT

A load transporter in which two supporting cushions of pressurized air are located one at each side of a load being moved, the load being supported by rigid beam members carried by rigid structures forming the upper boundary of the air cushions. In one embodiment the rigid beam members serve to join the rigid structures in spaced relationship, and are adapted to support the load either from below or above. In a further embodiment the rigid beam members are adapted to be secured to the sides of the load to permit taller loads to be transported, while maintaining the space relationship of the cushions. Propulsion of the transporter is either by towing, self-winching, or through the road wheels of a conventional vehicle being carried by the transporter.

9 Claims, 8 Drawing Figures

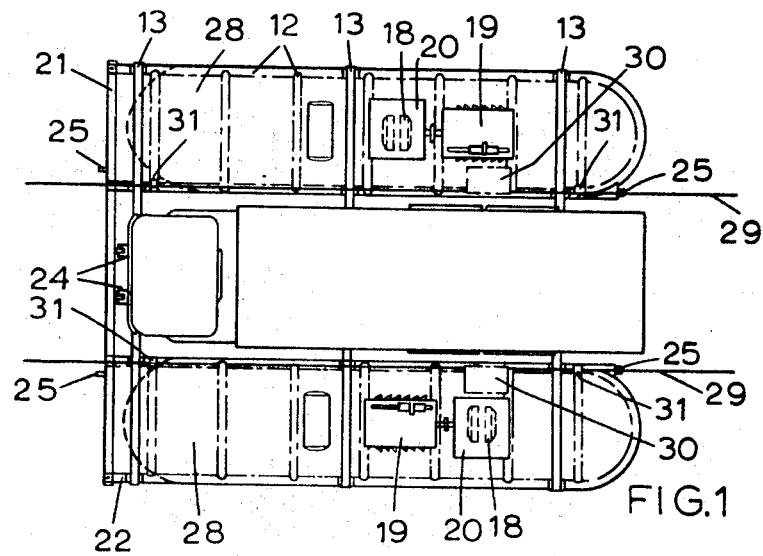
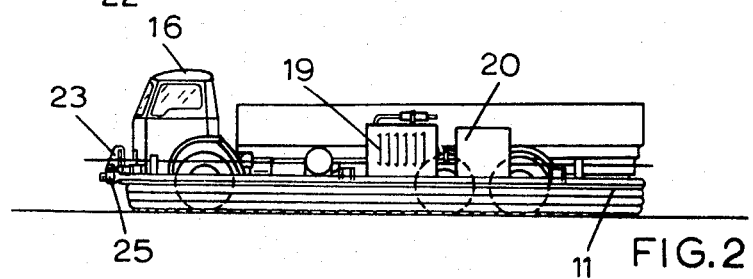
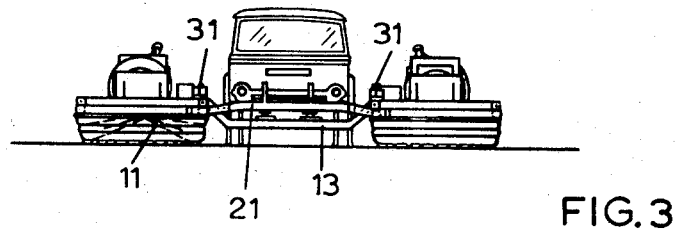

TRANSPORTERS

This invention relates to load supporting devices, and more particularly to devices which receive support from a cushion or cushions of pressurized air.

One application of such devices is in the role of off-the-road transporters. Such transporters may be used for moving heavy loads over valuable farmland which must not be damaged, and for moving heavy loads over infirm ground across which conventional wheeled vehicles cannot be used. Existing transporters comprise vehicles or vehicle trailers which have either permanently fitted air cushion apparatus or vehicles modified to facilitate the fitting and removal of air cushion apparatus. A further type comprises, in effect, a vehicle with permanently fitted air cushion apparatus which is designed to carry a loaded conventional vehicle. These devices are costly in manufacture and, as the air cushion facility is likely to be used only intermittently, they prove extremely uneconomical.

According to the invention I provide a load transporter which receives support from at least two cushions of pressurized air, the air cushions being bounded at least in part by flexible skirting assemblies depending from rigid structure and including means for supplying and maintaining pressurized air to the air cushions, the cushions being located outside the planform area of a load which is supported by rigid beam members carried by the rigid structure.

Although air is referred to as the supporting medium, it is to be understood that any suitable gas or fluid may be used.

The flexible skirting assemblies may be of the form disclosed in U.S. Pat. No. 3,258,080. It is to be understood, however, that the skirts are not limited to such a configuration, and other suitable forms may be employed which are well known to persons skilled in the art.

The invention will now be described by way of example only, with reference to the accompanying drawings, in which:

FIG. 1 is a plan view of one embodiment of the invention,

FIG. 2 is a side elevation of the arrangement shown in FIG. 1,

FIG. 3 is an end elevation of the arrangement shown in FIGS. 1 and 2,

Figure 5:
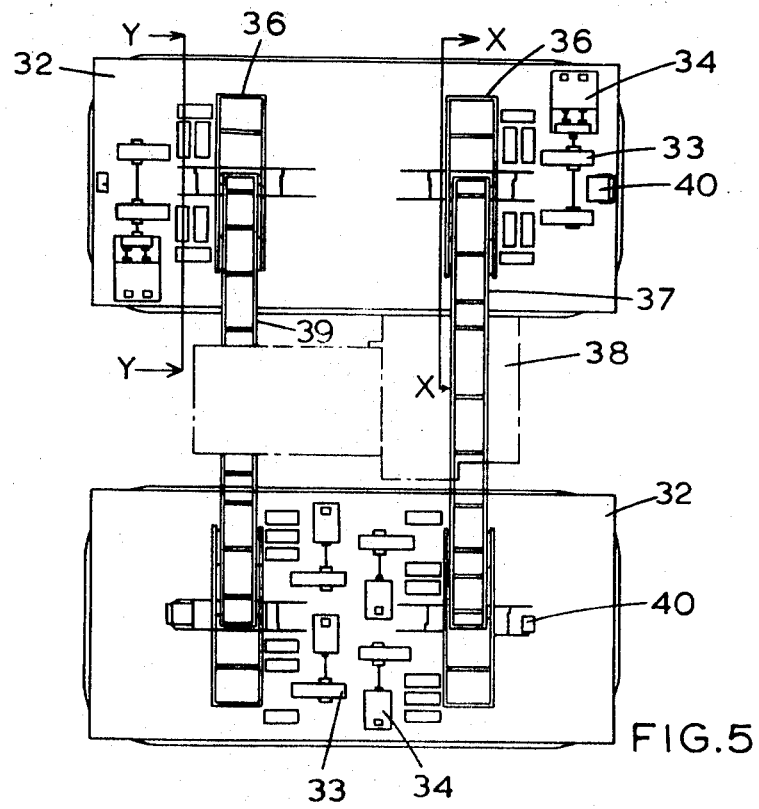
FIG. 5 is a plan view of a transporter according to a further embodiment.

Referring now to FIGS. 1, 2, 3 and 4B, flexible skirting assemblies 11 depend from rigid support structure 12 comprising welded tubular frameworks located on each side of a load carrying area. The flexible skirts can be attached either directly to the tubular framework or to flanges depending from the framework by any suitable means such as either bolting, rivetting or clamping by means of a clamp ring.

The flexible skirts are formed of sheets of flexible impermeable material which have folds disposed one above the other extending horizontally as described in U.S. Pat. No. 3,258,080.

The upper boundary 28 of the fluid cushions can be either sheets of flexible impermeable material which may be a continuation of the flexible skirts, or may be of rigid construction.

The two structures are joined by three rigid beam members 13 which are secured to upstanding flanges 14 on the tubular structures by either bolts or quick-release pins. Two vehicle chassis adapters 15 are secured to each beam member 13 to locate on the chassis of a conventional road vehicle 16. The support surfaces on the adapters on the forward and aft beam members have an upwardly extending flange 17 at their outer edges to act as guides when positioning the vehicle and to prevent lateral movement of the vehicle relative to the air cushions when the transporter is in motion. Vertical and lateral movement of the adapters is possible and this, together with the installation of a number of beam location positions on the rigid structure, enables the same apparatus to be used for a range of different vehicle chassis.

A pair of lift fans 18 and a motor 19 are mounted on each tubular framework, the fans being fitted in volutes 20 arranged to exhaust air directly into the respective cushion areas. A starter/throttle control for the fan motors is located in the vehicle cab and is connected to the motors after the vehicle has been positioned in the transporter.

The vehicle is positioned longitudinally by a locating beam 21 fitted across one end of the transporter. The beam is secured to extensions 22 of the tubular framework and, through vertically slotted brackets 23 on the beam, to towing points 24 on the vehicle. This arrangement enables the air cushion apparatus to be raised and lowered without affecting the relative longitudinal positions of the vehicle and the transporter. Towing points 25 are provided on the locating beam 21 and the tubular framework 12 at the opposite end.

Figures 4A, 4B:
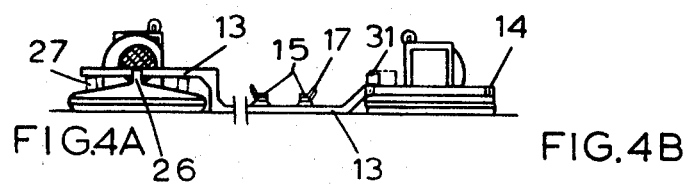
FIGS. 4A and 4B are end elevations similar to FIG. 3, showing two alternative methods of attaching the load carrying members to the air cushion structures.

An alternative method of securing the cushion supporting structure to the beam members is shown in FIG. 4A. Three centrally located flange members 26 secured to the support structure are pivotally attached to the three beam members 13 to permit a degree of freedom of the cushion assembly relative to the beams. Balance springs 27 can be fitted to bias the cushion assembly towards its normal flat ground position. This arrangement effectively increases the tolerance range of the transporter in respect of uneven terrain.

When no air is being supplied to the air cushions, the transporter rests upon the lower surface of the three beams. To facilitate loading, ramps can be used to permit the vehicle to drive over the beams, alternatively the beams could be sunk into shallow channels in the ground, thus dispensing with the necessity of ramps. The vehicle is located longitudinally in the transporter by inserting the pins to secure the vehicle to the locating beam 21. A power driven capstan unit 30 is provided on each cushion supporting structure 28 to operate cables 29 threaded through the capstan units and guide rollers 31. The capstans 30 can be operated either by a petrol engine, an electric motor, or hydraulically. The power source for the capstan units may be either mounted on the rigid structures or, in the case of hydraulic units, a hydraulic pump could be supplied on the vehicle being transported. The units may conveniently be controlled by control means mounted in the vehicle cab. To prevent the necessity of permanent modification to the vehicles, thus restricting the use of the invention, the controls for the fan motors 19 and the capstan units 30 could be mounted on an independent unit which is located in a convenient position in the vehicle cab after location of the vehicle in the transporter.

It will thus be apparent that three alternative methods of propulsion are possible on this embodiment. These are wheeled traction, towing and self-winching.

After location of the vehicle in the transporter the control lines for the fan motors 19 and the capstan units 20 are connected through the control unit in the cab. It is obviously advantageous to connect the capstan unit controls at the time of loading even if propulsion and steering is to be attempted through the road wheels, as it may subsequently be found that such propulsion is not possible, thus necessitating the connection of the control lines in adverse conditions after the run has been started.

Assuming that wheel traction is possible, the fan motor throttle control is regulated to control the speed of the fans to supply air to the air cushions sufficient to reduce loading on the vehicle wheels, thus extending the range of terrain conditions over which wheel traction is possible, the transporter is then propelled and steered by driving the vehicle in the normal manner.

Either the towing or the self-winching methods of propulsion can be employed for movement of the transporter over very soft, boggy terrain, where normal wheel traction is impracticable. The transporter can be towed by either an overland tractor or by a transportable winch anchored to the ground, this system being practicable over short runs of up to about 100 yards. Over greater distances of up to half a mile, or more if the terrain and route permits, the self-winching system may be utilized. Each end of both winch cables 29 are anchored at each end of the run and, if the capstan units are hydraulically operated, the hydraulic pump is started to provide the supply. The fan motors are operated to supply maximum airflow to the air cushions to raise the vehicle wheels clear of the ground. When the capstans are rotated the transporter pulls itself over the ground by winding in and feeding out the winch cables. The capstan units can be rotated either clockwise or counterclockwise, thus enabling the transporter to winch itself forwards and backwards between the anchored ends of the cables 29.

A further feature of this embodiment is that, upon disassembly, the component parts are of a size suitable for transportation by conventional vehicles.

Figure 6:
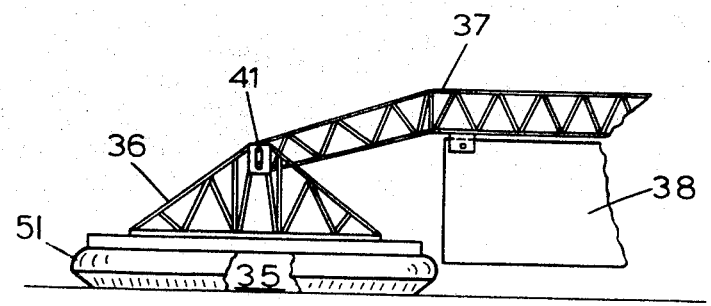
FIG. 6 is a view on lines X—X of FIG. 5, showing one side only of the transporter.
Figure 7:
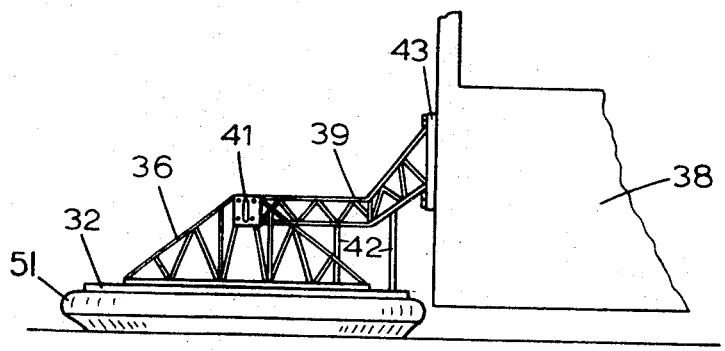
FIG. 7 is a view on lines Y—Y of FIG. 5, showing one side only of the transporter.

FIGS. 5, 6 and 7 show further embodiments of the invention adapted for transporting large static loads.

A flexible skirting assembly 51 is secured beneath each of two rigid structures 32 located one on either side of a central load carrying area. The flexible skirt on this apparatus is a two part skirt comprising an upper baglike member from which are depended a plurality of independent segments. It is emphasised that the flexible skirt arrangement forms no part of this invention, and that any arrangement well known to persons skilled in the art could be employed.

A plurality of fans 33 mounted on the rigid structure are driven by engines 34 and arranged to discharge air directly into the cushion space 35 bounded laterally by the flexible skirt 51. As will be seen from FIG. 5, the fans and engines can be arranged in various configurations on the rigid structure which provides clear space on the air cushion units to enable them to be used as independent load carrying platforms. Two welded tubular frameworks 36 are also mounted on the rigid structure 32 and provide a pivotal s of welded tubular beam members 37 (shown in one side only of FIG. 5 and in FIG. 6), from which a load 38 is suspended. The arrangement shown in the other side of FIG. 5 and in FIG. 7 comprises two welded tubular beam members 39 which are secured to the rigid structure 32, the ends being attached to the sides of the load 38. This arrangement is particularly suitable for moving a load of a greater height than the clearance between the overhead beam members 37 and the ground, though the "under load" beam arrangement described in the previous embodiment could also be used in this instance. Indeed, depending upon the load, combinations of under load beams, overhead beams, and side attachment beams could be used on one transporter.

Propulsion of the transporters shown in FIGS. 5, 6 and 7 is by either towing or self-winching, as described for the previous embodiment. Controls for the fan motors and capstan power units are grouped in cabs 40 which may be located either one at each end and or at one end only of the air cushion units.

FIG. 6 is an end view taken along line X—X of FIG. 5, showing one end only of the overhead beam arrangement. The ends of the rigid beam members 37 are pivotally mounted in rigid plates 41 supported by the framework 36. A degree of vertical movement to facilitate loading is provided by slots in the plates 41. The load 38 can be either suspended directly from the beams 37 or, alternatively, a crane arrangement could be suspended from the beams and operated from the cabs 40.

FIG. 7 is an end view taken along line Y—Y of FIG. 5, showing one end only of the side beam arrangement. The cushion unit employed is identical to that shown in FIG. 6. One end of the rigid beam members 39 are bolted to the plates 41 and attached to the rigid structure 32 by support members 42. The other ends of the beam members are terminated by a flange 43 which is bolted to the sides of the load 38.

The feature that the air cushion units can be used as independent load carrying platforms when not required as part of the transporter also means, of course, that loads which have to be moved from otherwise inaccessible areas present no problems. The air cushion units can be used to carry the rigid beam members and other ancillary equipment over normally impassable surfaces to be assembled around the load on arrival, no heavy equipment being required to position the load in the transporter.

Several embodiments of the invention have been described. It is to be understood, however, that modifications are possible within the scope of the appended claims. For instance, the beam members of the transporter shown in FIGS. 1, 2, 3, 4A and 4B could be supplied without chassis adapters, to enable static loads to be moved. Auxiliary power units would be provided on the rigid structure to operate the capstan units, thus retaining the self-winching facility previously described. Height adjustment means could be incorporated in the beam members to further increase the range of loads which can be carried by one particular transporter.

I claim as my invention:

1. A load transporter which receives support from two separate self-contained air cushion units, the air cushion of each unit being bounded at least in part by flexible skirting assemblies depending from rigid structure of the unit and each unit including means for supplying and maintaining pressurized air to the cushions, wherein the cushions are located outside the planform area of a load which is supported over unpressurized space by rigid beam member means detachably carried by the rigid structure and extending over unpressurized space between the units, said rigid beam member means extending between and being pivotally coupled to rigid structure of each air cushion unit generally in the area of the longitudinal axis of each air cushion unit, said beam member means being constructed and configured so as to be transportable by one of said units.

2. A load transporter as claimed in claim 1, wherein said beam member means comprises two rigid beam members extending across the unpressurized load carrying area between the air cushions and passing beneath a load being transported.

3. A load transporter as claimed in claim 2, wherein said rigid beam members are provided with adapters for location beneath the chassis of a wheeled vehicle.

4. A load transporter as claimed in claim 1, wherein said beam member means extends across the unpressurized load carrying area between the air cushions and passes above said load being transported.

5. A load transporter as claimed in claim 1, wherein said beam member means comprises two rigid beam members, each having a free end extending over said unpressurized space, and means on said free ends for attachment to the sides of said load.

6. A load transporter as claimed in claim 1, wherein said means for supplying pressurized air to said cushion includes at least one power driven fan on each rigid structure, means between said fans and said air cushions for conducting the discharged air from said at least one fan into the air cushion space beneath the rigid structure.

7. A load transporter as claimed in claim 1, wherein a power operated capstan unit is provided on each rigid structure, and cable means having one end fixed relative to said transporter and the other end secured to said capstan units communicating with to propel the transporter when said capstan units are operated.

8. Apparatus as claimed in claim 1 wherein the pivotal couplings between the beam member means and said rigid structures include means permitting limited relative vertical movement between the beam member means and each of said rigid structures.

9. Apparatus as claimed in claim 1 wherein said rigid beam member means includes end portions extending across said rigid structure of said air cushion units, said beam member means then extending downwardly at points inboard of each air cushion unit, and then across the unpressurized space between the air cushion units.

* * * * *